United States Patent [19]

Kosmo et al.

[11] Patent Number: 4,923,741

[45] Date of Patent: May 8, 1990

[54] HAZARDS PROTECTION FOR SPACE SUITS AND SPACECRAFT

[75] Inventors: Joseph J. Kosmo, Seabrook; Frederic S. Dawn, Houston, both of Tex.

[73] Assignee: The United States of America as represented by the Administrator, National Aeronautics and Space Administration, Washington, D.C.

[21] Appl. No.: 213,880

[22] Filed: Jun. 30, 1988

[51] Int. Cl.⁵ .......................... B32B 7/00; B32B 27/00
[52] U.S. Cl. .................................... 428/252; 428/290; 428/328; 428/422; 428/447; 428/458; 428/474.4; 428/911
[58] Field of Search ...................... 428/252, 422, 474.4, 428/290, 458, 328, 911, 447; 2/2, 2.1 A, 2.5

[56] References Cited

U.S. PATENT DOCUMENTS

| | | | |
|---|---|---|---|
| 2,328,105 | 8/1943 | Strobino | 250/108 |
| 2,981,954 | 5/1961 | Garbellano | 2/2.1 R |
| 3,011,172 | 12/1961 | Tames | 2/114 |
| 3,130,413 | 4/1964 | Schueller | 2/1 |
| 3,164,840 | 1/1965 | Reynolds | 2/2 |
| 3,211,153 | 10/1965 | Gambetti | 128/379.1 |
| 3,284,806 | 11/1966 | Prasser | 2/2.1 |
| 3,292,179 | 12/1966 | Iacono, Jr. et al. | 2/2 |
| 3,374,142 | 3/1968 | Kreckl | 161/50 |
| 3,465,153 | 9/1969 | Libby | 250/108 |
| 3,489,591 | 1/1970 | Cardarelli | 117/66 |
| 3,547,765 | 12/1970 | Snyder et al. | 161/189 |
| 3,563,198 | 2/1971 | Johnston | 112/402 |
| 3,586,596 | 6/1971 | Ainsworth et al. | 161/87 |
| 4,647,495 | 3/1987 | Kanayama et al. | 428/246 |
| 4,675,228 | 6/1987 | Little | 428/215 |

Primary Examiner—Marion C. McCamish
Attorney, Agent, or Firm—Russell E. Schlorff; John R. Manning; Edward K. Fein

[57] ABSTRACT

A flexible multi-layered covering article 10 for protection against the hazards of exposure to the environment of outer space. The covering 10 includes an outer layer section 12 comprising an outermost lamina 14 of woven expanded tetrafluoroethylene yarns (Gore-Tex) for protecting against abrasion and tearing, an underlying weave 16 of meta-aramid yarns (Nomex) and para-aramid yarns (Kevlar) for particle impart protection, an electrostatic charge dissipation and control system 18 incorporated therein, and a chemical contaminants control barrier applied as a coating 19. A middle section includes a succession of thermal insulating layers 21 of polymeric thermoplastic or thermoforming material, each of which is coated with a metal deposit of high infra-red emissivity and low solar radiation absorption characteristics and separated from adjacent insulating layers 21 by a low thermal conductance material 26. The covering 10 further includes a radiation attenuating layer 28 of a tungsten-loaded polymeric elastomer binder for protecting against "bremsstrahlung" radiation and an inner layer 32 of "rip-stop" polyester material for abrasion protection. A chloroprene coating may be supplied the polyester-material for added micrometeoroid protection. Securing means 36 of low heat conductance material secures the multi-layers together as a laminar composite.

20 Claims, 2 Drawing Sheets

HAZARDS PROTECTION FOR SPACE SUITS AND SPACECRAFT

ORIGIN OF THE INVENTION

The invention described herein was made by employees of the U.S. Government and may be manufactured and used by or for the Government of the U.S. of America for governmental purposes without the payment of any royalties thereon or therefor.

FIELD OF THE INVENTION

This invention relates to flexible coverings and more particularly to a multilayered structure for use as a space suit cover garment for protection of astronauts when exposed to the hazards of space environment or as a protective shield for space vehicles and extraterrestrial planetary structures.

BACKGROUND ART

For astronauts engaged in extravehicular activity in the space environment, it is necessary to provide protection against a variety of environmental hazards. The deployment of space stations and the prospect of long-term space missions including lunar base and planetary surface operations present additional and greater environmental hazards imposing greater and more stringent protection requirements. Accordingly, in the mission planning of such long-term space operations, special provisions must be made for chemical propellants protection, enhanced radiation shielding, electrostatic charge control, and in missions involving low earth orbit environments, protection against materials degradation from the erosive effects of atomic oxygen bombardment. In addition, because of the presence of orbital debris resulting from previous space vehicle launches and space missions, there must be increased protection against impacts.

Heretofore, space hazards protection has largely consisted of an integrated cover garment for space suits which provides protection against abrasion, sharp objects, thermal extremes, and impacts by micrometeoroids of a specified size range and limited mass flux density. While protection against many of the hazards to be encountered in space operations have been disclosed in the prior art, there is no single system which can meet the requirements noted above. For example, U.S. Pat. No. 3,164,840 discloses a garment fabric having at least one layer of a wire mesh therein for protecting against a high frequency electromagnetic field and U.S. Pat. No. 3,284,806 discloses a garment having external wire mesh for minimizing abrasion. U.S. Pat. No. 3,489,591 discloses a fabric made with water insoluble fibers coated with a lanthanum oxide, polytetrafluoroethylene mixture for radiation protection. U.S. Pat. No. 3,563,198 entitled, "Fabric for Micrometeoroid Protective Garment" addresses stitching fabrication techniques to preclude heat "shorts" through layers of garment construction but does not address the totality of extravehicular environment hazards protection.

A radiation control system for space suits utilizing rigid layers of high atomic number materials is disclosed in U.S. Pat. No. 3,465,153 and alternate rigid layers of low and high atomic number materials in a radiation control system for spacesuits are shown in U.S. Pat. No. 3,130,413. U.S. Pat. No. 2,328,105 discloses an X-ray shield including a layer of porous material in which particles of a substance opaque to X-rays is dispersed throughout the pores thereof and U.S. Pat. No. 3,374,142 discloses a multilayered textile for insulation against heat and cold which is manufactured from synthetic fibers including nylon, polyester fleece, and polyethylene terephthalate. U.S. Pat. No. 3,211,153 discloses an anti-electrostatic garment with wire mesh in a fabric layer and various chemical protection features in garment fabrics are disclosed in U.S. Pat. Nos. 3,547,765; 3,586,596; 3,292,179, and 4,675,228. However, a single comprehensive protection system for protecting against the multiplicity of hazards to be encountered in long duration space operations has been lacking.

SUMMARY OF THE INVENTION

The present invention is a flexible multi-layered composite of materials in a unique arrangement and design which serves as a protective covering for man and structures alike when exposed to the hazards of the space environment and particularly the hazards associated with space operations of relatively long duration. The covering is comprised of an outer layer which provides for abrasion protection, electrostatic charge dispersion, and protection against corrosive attack of chemical propellants. It further includes a succession of thermally insulating layers for protection against thermal extremes, a nuclear ionization radiation attenuating layer in the form of a polymeric elastomer binder material loaded with powder-sized particles of high density, high atomic number material, and a final anti-abrasion inner layer of a Neoprene-coated polymeric synthetic resin material such as "rip-stop" nylon.

The outer layer is a laminar composite known commercially as Orthofabric which includes an outermost layer of woven expanded tetrafluoroethylene fibers, known commercially as Gore-Tex, and an underlying layer of meta-aramid and para-aramid fibers in a special weave therewith. Orthofabric is a product of Fabrics Development, Inc., Quakertown, Pa. and Gore-Tex, is a product of W.L. Gore & Associates, Inc., Elkton, MD. The meta-aramid and para-aramid fibers are best known as Nomex and Kevlar, products of E.I. DuPont de Nemours, Inc. Also woven with the Nomex and Kevlar yarns are wires or electrically conductive fibers in a criss-cross arrangement which provides for electrostatic charge dispersion and a discharge path in the event of contact with unlike charged bodies. In addition, a special coating applied to the Nomex and Kevlar weave provides a chemical contaminant control barrier for resisting chemical propellants.

Each of the middle layers of thermal insulation is a thin film or fabric of polymeric thermoplastic or thermoforming resin on which is vacuum deposited a metallic material with the characteristics of high infra-red emissivity and low solar radiation absorption. The layers of thermal insulation are separated by a spacer material of low thermal conductivity such as a non-woven polyester scrim, which is adhesively applied between adjacent thermal insulation layers to prevent thermal "shorting". Next adjacent the thermal insulation layers, the nuclear ionization radiation attenuation layer is in the form of a polymeric elastomer binder material which is loaded with micron size particles of powdered high density, high atomic number material such as tungsten. The next adjacent layer is an anti-abrasion layer which also serves as a structural support for all the other layers and is the final inner layer of the protective covering.

DETAILED DESCRIPTION OF THE INVENTION

Figure 1:
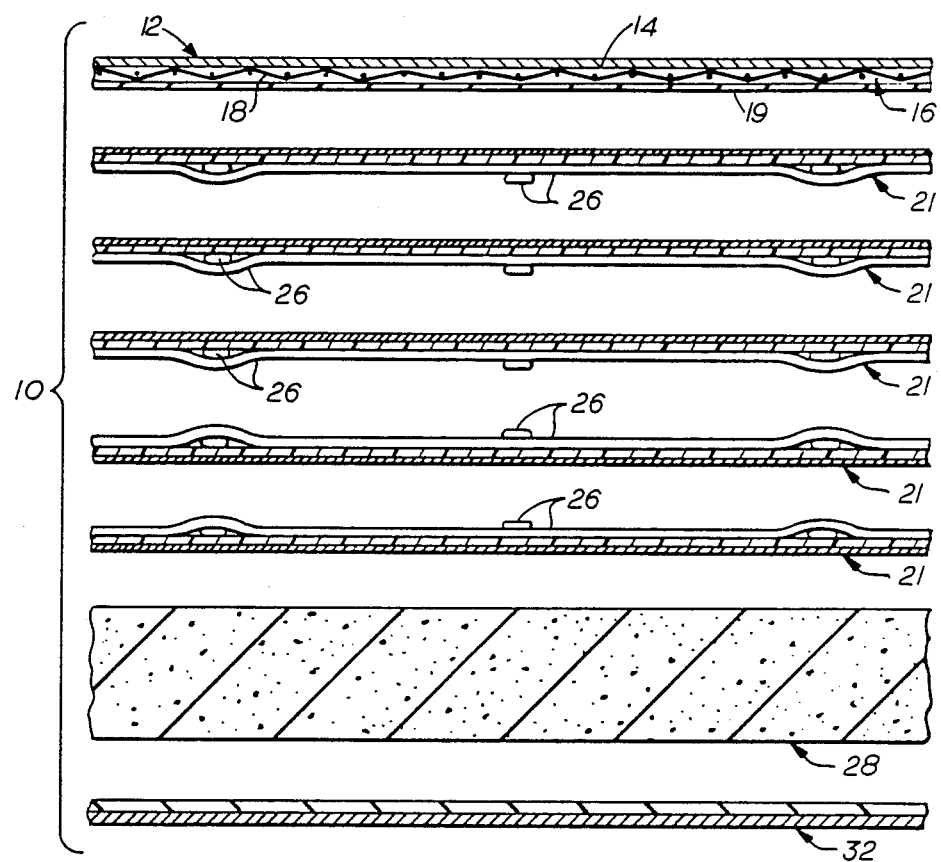
FIG. 1 is an exploded view of the multi-layered flexible covering of the invention wherein each of the layers is shown in cross section and greatly enlarged.

Referring more particularly to the drawings, there is shown FIG. 1 in exploded relation, a multilayered composite structure of a covering article 10 representing a preferred embodiment of the invention.

The covering article 10 includes an outer layer 12 which provides the principal protection against abrasion and tearing by sharp cornered objects as well as the principal protection against impacts from micrometeoroids and particles of debris.

The outer layer 12 is a composite of three separate textile materials in a specialized weave combination previously identified as "Orthofabric". The outermost material of the Orthofabric composite previously identified as Gore-Tex is a woven fabric 14 of 400 denier yarn formed of 100% expanded tetrafluoroethylene fibers. Woven into the underside of the Gore-Tex is a special weave 16 of Nomex and Kevlar fibers, each of 200 denier yarn. In the Orthofabric, the special weave of Nomex and Kevlar yarns is characterized in the warp direction by a two ply Kevlar yarn repeated for every 23 Nomex yarns and in the filling direction repeated for every 14 Nomex yarns. This results in a grid-like arrangement of Kevlar yarns with spacing between the yarns of approximately ½ inch. Accordingly, the outer surface provided by the Gore-Tex outermost layer 14 imparts to the garment a high degree of resistance to abrasion and tearing by sharp cornered objects while the tough underlying weave 16 of Nomex and Kevlar yarns provides protection against puncture by micrometeoroids and debris as well as "rip-stop" protection against sharp corners and edges.

Figure 2:
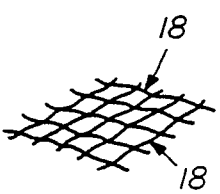
FIG. 2 is a fragmentary perspective view, showing the arrangement of filaments woven into the outer layer of the flexible covering of FIG. 1 and providing a means for electrostatic charge control.

Another hazard associated with space flight and the space environment is that in some orbits, primarily those associated with operations involving high inclination orbits or polar orbits, static electrical charges may be induced by the auroras on the surface of an extravehicular object such as a space suited crew member or satellite. It is a great concern that these charges might find their way into electronic circuits and disrupt circuit operation or even disable the circuits. To avoid such damaging potentialities, electrically conductive fibers of carbon, metal or polymeric filaments 18 are woven with the Nomex and Kevlar yarns in the outer layer material in a criss-cross arrangement with approximately ¼ inch or 60 mm. spacing between the filaments or carbon fibers which are disposed to normally contact the similarly spaced filaments or carbon fibers at right angles thereto (FIG. 2). Such a grid-like array of electrically conductive elements results in a more uniform distribution and dispersion of charges over the outer surface of the covering article 10 in the event of a charge build-up and also provides a safe path for the discharge of electrically charged particles should the protectively covered astronaut, spacecraft or satellite come in contact with bodies of unlike electrical charges, as might very likely occur during extravehicular servicing, maintenance and repair operations.

It will therefore be seen that the outer layer incorporates protective features including basic abrasion and sharp corner protection, electrostatic charge control and protection against impacts from micrometeoroids and space debris. It also serves as an effective barrier to dust in lunar or planetary dust environments to which it may be exposed. However, it is also exposed to other particles such as chemical contaminants which may be in the immediate vicinity. Space satellite and spacecraft propellants such as monomethylhydrazine ($N_2H_3CH_3$), hydrazine ($N_2H_4$), nitrogen tetroxide ($N_2O_4$), and ammonia ($NH_3$), used in servicing space radiators, are known to be very harmful to space suits and space structure materials when in contact therewith or in close proximity thereto. Particularly, such propellant contaminants are very capable of severely damaging the inner thermal superinsulation layers of protective cover garments for space suits. Accordingly, in the instant invention, a chemical contaminants control barrier as a protection against those hazardous chemicals is provided by a tetrafluoroethylene (Teflon)-fluoroethylene propylene laminate 19, known as FEP, or alternatively, a silicone coating applied, preferably by a spray process, to the inside surface of the Orthofabric, i.e., against the Nomex-Kevlar weave. The silicone and FEP have resistance to a broad range of chemicals and are particularly resistant to the propellants identified above. Where maximum flexibility is an important goal, such as in a space suit cover garment application where maximum mobility is needed, the selection of a thin silicone coating is preferred.

Since objects in the vacuum environment of space are exposed to a wide range of temperatures in the order of approximately $-275°$ F. to $+240°$ F., the ability to withstand such a wide range of temperatures and thermal extremes is a critical necessity. In the instant invention, the middle layers of the covering 10 contain specific materials and specific construction to provide for protection against such thermal extremes. To achieve thermal protection, multi-layers 21 of an aluminized polymeric thermoplastic or thermoforming resin material such as aluminized Mylar, aluminized Kapton, or aluminized "rip-stop" fabric are employed. As used in the art, the term "rip-stop" is descriptive of a lightweight fabric of unbalanced construction designed to provide tear resistance through the use of a set of stronger warp and filling yarns in an alternate spacing construction. The Mylar or Kapton is formed as a very thin film of approximately 1 mm thickness on which is vacuum deposited a very thin coating of aluminum of approximately 700 Angstrom units thickness. The "rip-stop" fabric may similarly have a thin coating of aluminum deposited. While vacuum depositing is the preferred method of coating, other techniques such as vapor depositing might also be employed.

To prevent thermal "shorting" between the individual layers of aluminized material, the individual layers are separated from each other through the use of a low thermal conductive spacer material, such as a nonwoven Dacron scrim 26 in a marquisette or grid pattern which is bonded to the Mylar, Kapton, or polyester film by a suitable adhesive. Typically, the number of layers of insulation and arrangement of the layers will be dependent upon the specific thermal environment design parameters for the particular application, whether it be a covering for a space suit, spacecraft, satellite, lunar or planetary base structure. Also, many variations in the arrangement of the thermal protective layers can be made to achieve a selected thermal environment design as by deleting layers, or reversing selected layers such as the lower layers 21 in FIG. 1 to minimize heat loss out of the space suit or space vehicle or other space structure.

It is also intended that for fixed-wall or solid hull structure space suits, spacecraft, satellites, lunar or planetary surface structures, the extravehicular protective covering 10 can be employed as an integral layup or overwrap to the wall or hull structure and serve effectively as an environment thermal protective barrier. Where maximum long term wear endurance due to high flexure cycles are required (such as in a space suit overgarment application), the aluminized "rip-stop" polyester fabric is recommended. For some applications it might also be desirable to intermix layers, for example, aluminized Kapton with aluminized "rip-stop" fabric to achieve an optimum combination of high thermal protection and a high degree of flexibility. It is also to be noted that Mylar, Kapton, and "rip-stop" fabric are all polymeric thermoplastic or thermoforming resins, synthetic materials of relatively low atomic number, and in the form of a very thin film or fabric are very flexible and durable. Accordingly, other polymeric resins having similar characteristics could therefore be substituted. Also, metals such as gold or silver, which have high infra-red emissivity and low solar radiation absorption characteristics could also be selected as the vacuum deposited material as a substitute for aluminum.

A further serious concern in the vacuum environment of space is the ionizing radiation produced by solar flare events, trapped solar electrons and protons from the Van Allen belts, and cosmic radiation emanations from deep space galactic sources. It is known, of course, that nuclear particle transport through matter is mostly controlled by the electron density of the particular material and in this respect, the energy losses sustained by nuclear particles due to ionization in particle transport through matter are greatest for low density materials. Accordingly, the relativity low atomic number materials represented by Teflon, Nomex, Kevlar and silicone in the outer layer together with the low atomic number materials in the thermal protective layers provide effective radiation protection from protons and other nuclear particles.

On the other hand, protection against secondary radiation, the "bremsstrahlung effect" produced by the sudden retardation of an electrical particle in an intense electric field, is best provided by relatively high density materials which inflict energy losses resulting from Compton-scattering collisions and the photoelectric phenomenon. Accordingly, the covering 10 includes a radiation protective media in the form of a layer 28 of tungsten-loaded polymeric elastomer such as silicone rubber or tetrafluoroethylene fabricated in its formulation by uniform mixing of tungsten particles in micron sized powder form with the tetrafluoroethylene or silicone rubber as a binder material, which mixture is then extruded as a smooth sheet. Variations in the amount of tungsten added by weight to the binder material as well as thickness and number of plies utilized for radiation attenuation would again, as in the case of thermal protection requirements, will depend upon the specific radiation environment design parameters for the particular space suit, spacecraft, satellite, lunar or planetary base structure. It is also possible that other high density, high atomic number materials could be used in lieu of tungsten. However, the use of tungsten in lieu of lead powder in compounding the loaded radiation attenuation layer is much preferred due to tungsten's higher density and its non-toxic properties.

In the composite layup of the covering article 10, a final layer 32 of polymeric synthetic resin material is provided in the form of a woven "rip-stop" material. The "rip-stop" material is preferably coated on the side thereof facing the thermal protection layers with a coating of chloroprene or Neoprene. This final inner layer 32 serves as an anti-abrasion layer and structural support for the previously identified multi-layers. For this purpose, "rip-stop" nylon is a suitable selection. The Neoprene coating serves to provide added protection from micrometeoroids.

Figure 3:
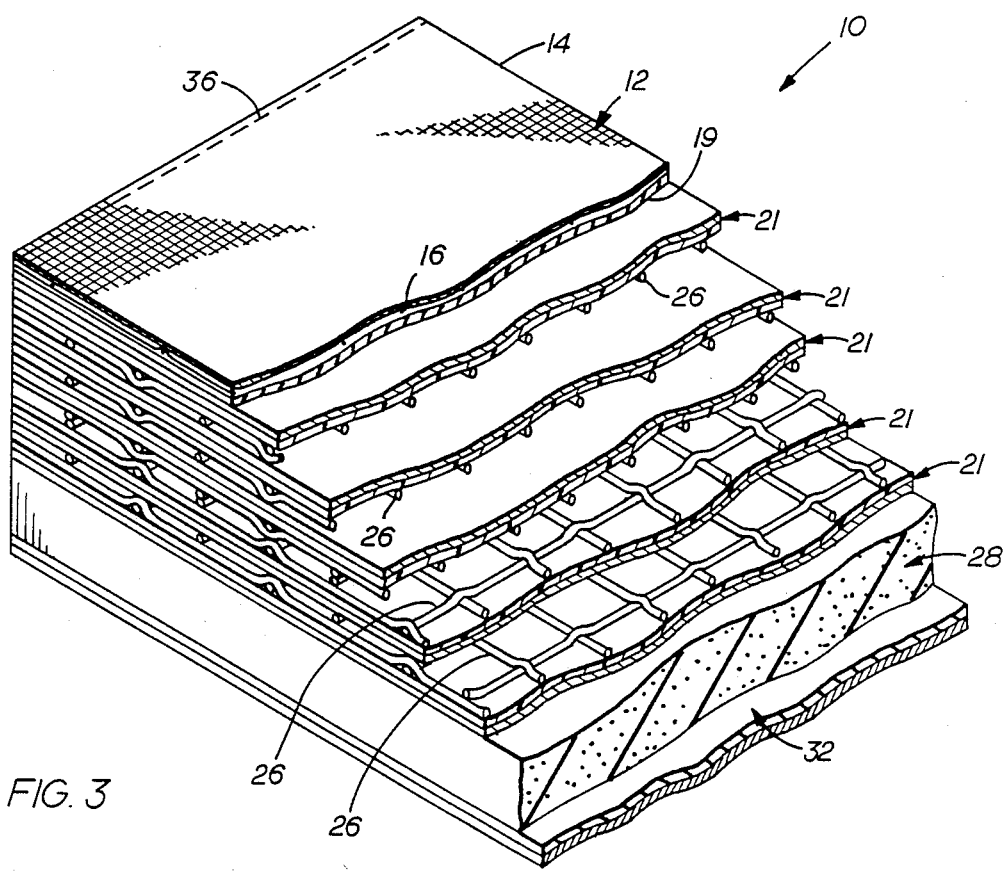
FIG. 3 is a fragmentary view of the flexible covering of FIG. 1 in slightly reduced scale relative thereto, wherein each of the layers forming the multi-layered composite covering is partly broken away for purposes of illustration.

To hold all the layers of the covering article 10 together in a composite as shown in FIG. 3, a polyester thread stitching 36 is preferred, although various other threads, or a lacing cord could be used as well. It would be possible, also, to use brads, grommets or the like for binding the layers together since the particular mode of binding is not a crucial part of the invention, so long as thermal "shorting" does not become a problem.

It is therefore to be noted that variations in the multi-ply composite configuration of the invention can readily be made to accommodate the unique protective design requirements for the specific extravehicular environmental hazards encountered by space suited crew members, spacecraft, satellites as well as lunar and extraterrestrial planetary surface structures. Also, the nature of the construction features of the invention permits the multi-layer fabric-based and film materials to be easily patterned and shaped to anthropomorphic configured space suits as well as being formed as blankets or mats, or as flexible structural over wraps for use on spacecraft hulls, satellites or space structures.

It will therefore be seen that the present invention is uniquely designed to provide protection against a variety of environmental hazards encountered by space suited astronauts, spacecraft, satellites as well as lunar and planetary surface structures. This is accomplished through the use of a passive integrated, multi-layered composite of fabric based materials with incorporation therein of abrasion resistant features, a chemical propellant barrier coating, electrostatic dissipation features, radiation attenuation capability, enhanced micrometeoroid/particle protective capabilities and thermal protection features.

It is also to be understood that the foregoing description of a preferred embodiment of the invention has been presented for purposes of illustration and explanation and is not intended to limit the invention to the precise form disclosed. It is to be appreciated therefore that various material and structural changes, many of which are suggested herein, may be made by those skilled in the art without departing from the spirit of the invention.

What is claimed is:

1. A flexible covering article for providing protection against the hazards of exposure to the environment of outer space and extraterrestrial surfaces, said covering article comprising:

an outer layered section including an outermost lamina of woven expanded tetrafluoroethylene yarns for protecting against abrasion and tearing, an underlying lamina of interwoven meta-aramid fiber yarns and para-aramid fiber yarns which are also woven to the inner side of said outermost lamina section, means including a plurality of electrically conductive elements woven in said underlying lamina with said meta-aramid and para-aramid fiber yarns for distribution and dispersion of electrostatic charges which may accumulate on said outer layered section and for providing a potential discharge path for said charges, and chemical protection means in the form of a coating applied to the inward side of said interwoven meta-aramid and para-aramid fiber yarns for protecting against chemical attack from chemical contaminants comprised of spacecraft propellants;

a middle section comprised of a plurality of successively adjacent thermal insulation layers in the form of thin films or fabrics of polymeric thermoplastic or thermoforming resin material, each of which is coated on one surface by a deposit of metallic material which exhibits a high degree of infra-red emissivity and low absorption of solar radiation, and a low thermal conductive spacer means for spacing each of said thermal insulation layers, to preclude thermal "shorting" between said thermal insulation layers;

a flexible radiation attenuating section for protecting against secondary radiation produced by the bremsstrahlung effect and comprised of a layer of flexible binder material loaded with micron sized powder particles of a high density, high atomic number material uniformly dispersed therein;

an innermost layer of woven polymeric thermoforming resin yarns for protecting against abrasion; and means for securing all of said layers of said covering together in a flexible laminated composite relationship.

2. A flexible covering article as recited in claim 1 wherein said electrically conductive elements are carbon fibers or filaments which are interwoven with the meta-aramid and para-aramid fibers in a criss-cross arrangement wherein the electrically conductive elements are in contacting relationship at their crossing points.

3. A flexible covering article as recited in claim 2 wherein said electrically conductive fibers are carbon fibers.

4. A flexible covering article as recited in claim 1 wherein said chemical protection means is a tetrafluoroethylene-fluoroethylene propylene laminate applied to the surface of said underlying lamina of interwoven meta-aramid and para-aramid fiber yarns.

5. A flexible covering article as recited in claim 1 wherein said chemical protection means comprises a silicone coating applied to the surface of said underlying lamina of interwoven meta-aramid and para-aramid fiber yarns.

6. A flexible covering article as recited in claim 1 wherein said thermal insulation layers include an aluminized film of thermoplastic material.

7. A flexible covering article as recited in claim 1 wherein said thermal insulation layers include a layer of polyester fabric having a coating of metallic material applied to one surface thereof, said metallic material having the characteristics of high infra-red emissivity and low solar radiation absorption.

8. A flexible covering as recited in claim 7 wherein said thermal insulation layers are arranged with their metallized surfaces disposed toward said outer layer of the covering.

9. A flexible covering article as recited in claim 1 wherein said spacer means separating the thermal insulation layers is a scrim of light weight polymeric thermoforming resin material.

10. A flexible covering article as recited in claim 1 wherein the binder material of said radiation attenuation layer is silicone rubber.

11. A flexible covering article as recited in claim 1 wherein the binder material of said radiation attenuation layer is tetrafluoroethylene 12. A flexible covering article as recited in claim 1 wherein the binder material of said flexible radiation attenuation layer is loaded with particles of powdered tungsten.

13. A flexible covering article as recited in claim 1 wherein said innermost layer of woven polymeric thermoforming resin yarns is a "rip-stop" polyester fabric having a coating of chloroprene on the surface thereof which is disposed toward said radiation attenuation layer and provides additional protection from micrometeoroids.

14. A flexible multi-layered covering article for protection against the hazards of exposure to the environment of outer space, including:

an outer layer section comprising an outermost lamina of woven expanded tetrafluoroethylene yarns for protecting against abrasion, an underlying weave of meta-aramid yarns and para-aramid yarns for protection against tearing, an electrostatic charge dissipation and control system incorporated therein, and a chemical contaminants control barrier;

a middle section including a succession of thermal insulating layers of polymeric thermoplastic or thermoforming material, each layer being coated with a metal deposit of high infra-red emissivity and low solar radiation absorption characteristics and separated from adjacent insulating layers by a low thermal conductance material;

a radiation attenuating layer of a tungsten-loaded polymeric elastomer binder for protecting against "bremsstrahlung" radiation and meteoroid and debris particle protection;

an inner layer of "rip-stop" polyester material for abrasion protection; and securing means of low heat conductance material securing the multi-layers together as a laminar composite.

15. A flexible covering article as recited in claim 14 wherein the polyester material is coated with chloroprene for added micrometeoroid protection.

16. A flexible covering article as recited in claim 14 wherein the electrostatic charge dissipation and control system is formed of carbon fibers in a crisscross arrangement.

17. A flexible covering article as recited in claim 14 wherein the chemical contaminants control barrier is a tetrafluoroethylene-fluoroethylene propylene laminate applied to the weave of meta-aramid and para-aramid yarns.

18. A flexible covering article as recited in claim 14 wherein the chemical contaminants control barrier is a silicone coating applied to the surface of the weave of meta-aramid and para-aramid yarns.

19. A flexible covering article as recited in claim 14 wherein the thermal insulation layers include an aluminized film of thermoplastic material.

20. A flexible covering article as recited in claim 14 wherein a scrim of light weight polymeric thermoforming resin material separates the thermal insulation layers.

* * * * *